(12) United States Patent
Yokota et al.

(10) Patent No.: US 6,392,184 B1
(45) Date of Patent: May 21, 2002

(54) TORCH FOR GAS SHIELDED ARC WELDING USING CONSUMABLE ELECTRODE

(75) Inventors: Buhei Yokota; Ryuta Ito; Yasuji Hashimoto; Hajime Yamada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/691,901

(22) Filed: Oct. 19, 2000

(51) Int. Cl.$^7$ .............................................. B23K 9/173
(52) U.S. Cl. .......................................................... 219/74
(58) Field of Search ........................... 219/74, 75, 137 R

(56) References Cited

U.S. PATENT DOCUMENTS

| | | | |
|---|---|---|---|
| 2,758,186 A | * 8/1956 | Ludwig ........................ | 219/74 |
| 2,859,328 A | * 11/1958 | Sohn ............................ | 219/74 |
| 2,919,341 A | * 12/1959 | Roth et al. .................... | 219/74 |
| 3,270,178 A | * 8/1966 | Keller .......................... | 219/74 |
| 3,473,002 A | * 10/1969 | Suzuki ......................... | 219/74 |
| 4,037,078 A | * 7/1977 | Oishi et al. ............. | 219/137 R |
| 4,166,940 A | * 9/1979 | Barger et al. ................. | 219/74 |

FOREIGN PATENT DOCUMENTS

| | | |
|---|---|---|
| DE | 79 28 898 | 10/1980 |
| FR | 1 433 400 | 6/1996 |
| JP | 09085448 | 3/1997 |
| JP | 10128546 | 5/1998 |

\* cited by examiner

Primary Examiner—Clifford C. Shaw
(74) Attorney, Agent, or Firm—Merchant & Gould, P.C.

(57) ABSTRACT

A welding torch comprises a torch body having a wire guide cylinder for guiding a welding wire; an internal cylinder fitted to the torch body in such a manner as to surround the wire guide cylinder; and an external cylinder fitted to the internal cylinder in such a manner as to surround the internal cylinder. The primary interception of outside air is effected with a second shielding gas layer blown off from a second gas passageway on the outer side, and the complete interception of outside air is effected with a first shielding gas layer blown off from a first gas passageway on the inner side. Consequently, it is made possible thereby to sufficiently prevent outside air from reaching a molten pool and also sufficiently suppress the generation of an unfavorable surface oxide, thus enabling welding work to be satisfactorily practiced by using the above welding torch.

3 Claims, 4 Drawing Sheets

TORCH FOR GAS SHIELDED ARC WELDING USING CONSUMABLE ELECTRODE

BACKGROUND OF THE INVENTION

1. Field of the Invention

The present invention relates to a torch for gas shielded arc welding using a consumable electrode. More particularly, the invention pertains to a welding torch used therefor and well suited for titanium welding.

2. Description of the Related Art

Articles of stainless steel are bonded to one another by means of welding such as arc welding with a covered electrode, TIG (tungsten inert gas) welding, MIG (metal inert gas) welding, electron beam welding or the like. Articles of titanium which are more enriched in activity than stainless steel articles are bonded to one another by welding such as TIG welding, MIG welding, electron beam welding or the like.

In the case of welding with a covered electrode, It Is impossible to completely prevent ambient air (oxygen) from mixing in a deposited metal, whereby the deposited metal is made brittle. As an alternative, it is preferred to employ TIG welding by which welding is carried out with a tungsten (W) electrode, while the electrode is shielded from outside air with a shielding gas.

However, the above-mentioned TIG welding is of limited productivity because of a limited current load on a tungsten electrode. Thus, it becomes necessary to employ gas shielded arc welding in which a consumable electrode is used for the reason that a current load can surpassingly be enhanced when welding is performed with a melting electrode. The aforesaid gas shielded arc welding using a consumable electrode is exemplified by MIG welding, MAG (metal active gas) welding and $CO^2$ (carbon dioxide) gas shielded arc welding. In the MIG welding, an inert gas such as argon gas is used as a shielding gas. In the MAG welding, use is made, as a shielding gas, of a mixed gas in which an inert gas is mixed with a slight amount of oxygen gas or carbon dioxide gas. In $CO^2$ gas shielded arc welding, carbon dioxide gas is used. Since argon gas is expensive while carbon dioxide gas is inexpensive, the MAG welding is advantageous, and $CO^2$ gas shielded arc welding is further advantageous from the aspect of production cost. The MIG welding, MAG welding and $CO^2$ gas shielded arc welding are similar to one another with respect to electrode melting and interception of outside air with a shielding gas. It being so, the term "gas shielded arc welding using a consumable electrode" is used as such, or as the case may be, referred simply as "MIG welding" hereinafter.

MIG welding has recently been advanced in its improvement and commercialization. Thus, proposals were made for instance, on a torch structure in Japanese Patent Laid-Open Publication No. HEI-10-128546 entitled "TORCH FOR ARC WELDING", and on torch cleaning technology in Japanese Patent Laid-Open Publication No. HEI-9-085448 entitled "TORCH FOR WELDING". Nevertheless, it has been proved that even by the use of the above-mentioned welding torch, the fundamental problems as described hereunder still remain unsolved.

Hereinafter, description will be given as to the principle of a conventional torch with reference to FIG. 4 hereof. Torch 100 for MIG welding is a widely used and typical one comprising: a torch body 104 equipped with a wire guide cylinder 103 which guides a welding wire 102 that is fed downward in FIG. 4 at a prescribed feed rate by means of feed rollers 101, 101; a gas nozzle 105 fitted to the torch body 104 in such a manner as to surround the wire guide cylinder 103; and a shielding gas passageway 107 for feeding a shielding gas in a gas passageway 106 formed between the wire guide cylinder 103 and the gas nozzle 105.

In this arrangement, when welding voltage is applied between the welding wire 102 and a weld base metal 110, discharged arcs 111 are scattered and produce arc heat therebetween, by which heat the weld base metal 110 as well as the welding wire 102 melt away. In the Figure, reference numerals 112 and 113 denote a molten pool and deposited metal, respectively.

At this time, an inert gas is fed in the gas passageway 106 through the shielding gas passageway 107, and is ejected through the lower end of the gas passageway 106, namely the opening at the lower end of the gas nozzle 105 as shown by arrows ①, ①, that the discharge arcs 111 are enclosed by the inert gas thus ejected so as to prevent outside air (oxygen) from reaching the molten pool 112. The interception of outside air with a gas is termed "gas shielding", and the gas used therefor is termed "shielding gas".

Next, reference is made to FIG. 5 illustrating a problem with the conventional MIG welding. When the MIG welding torch 100 is moved from front to back, the weld base metal 110 as illustrated in FIG. 5 causes a surface oxide 114 although being in a slight amount to sometimes generate in the vicinity of the deposited metal. The surface oxide 114 is generated in stainless steel, and inter alia markedly in titanium which is an active metal more prone to combine with oxygen.

It being so, the discharged arcs 111 rock towards the surface oxide 114. The rocking phenomenon, which is termed "wandering phenomenon", instabilizes welding itself when arises. When the feed rate of the inert gas is increased as a countermeasure against the generation of the surface oxide 114, the inert gas constitutes so-called "turbulent flow". The resultant turbulent flow catches up circumferential gases, thereby causing outside air to be caught up therein with the result that the increased feed rate thereof is not recognized as a considerably effective countermeasure.

With regard to the aforesaid wandering phenomenon, the MAG welding can be said to be an improved method over the MIG welding from the viewpoint that a slight amount (several percent) of oxygen gas or carbon dioxide gas is mixed in the inert gas in order to suppress the phenomenon.

In the MAG, welding argon gas is mixed with, for example, 2.0% to 3.0% of oxygen gas. The amount of the oxygen gas, hen being less than. 2.0%, causes the wandering phenomenon, whereas the amount, when being more than 3.0%, brings about the unfavorable result that the surface oxide 114 becomes more prone to be generated. It is therefore obliged to strictly regulate the mixing proportion of the gas to be added thereto (oxygen gas). For this reason, the burden on a welding worker is greatly increased, or it becomes necessary to adopt a mixing unit equipped with a precise control unit. Accordingly, it follows that the MAG welding results in high welding cost as compared with the MIG welding.

SUMMARY OF THE INVENTION

It is therefore an object of the invention to provide a technique which enables welding technically comparable to MAG welding at a welding cost competitive with MIG welding, and also a technique which enhances the quality of welding, in the case of welding stainless steel and titanium that are more prone to combine with oxygen.

To attain the foregoing object, according to the present invention, there is provided a torch for gas shielded arc welding using a consumable electrode, comprising: a torch body having a wire guide cylinder for guiding a welding wire; an internal cylinder fitted to the torch body in such a manner as to surround the wire guide cylinder; an external cylinder fitted to the internal cylinder in such a manner as to surround the internal cylinder; a first shielding gas feed route for feeding a shielding gas in a first gas passageway formed between the wire guide cylinder and the internal cylinder; and a second shielding gas feed route for feeding the shielding gas in a second gas passageway formed between the internal cylinder and the external cylinder.

The above-mentioned torch has a tip configuration of double pipe structure composed of an internal cylinder and an external cylinder, and a shielding gas is fed in a first gas passageway formed in the internal cylinder, and in a second gas passageway formed between the internal cylinder and the external cylinder. Thus, primary interception of outside air is put into practice with a second shielding gas layer blown off through the second gas passageway arranged on the outer side, and complete interception of outside air is put into practice with the first shielding gas layer blown off through the first gas passageway arranged on the inner side.

Preferably, the internal cylinder is composed of a large diameter portion which is fitted to the torch body, and a small diameter portion at an end which is connected to the large diameter portion via a tapered tubular portion. It is made possible to increase the flow velocity of the shielding gas blown off through the internal cylinder by such construction that the small diameter portion is formed at an end and also to fit the cylinder to an existing torch body by forming the large diameter portion at the root portion thereof.

Also preferably, a porous member is allowed to intervene between the internal cylinder and external cylinder (second gas passageway) so as to rectify the shielding gas passing through the second gas passageway. The porous member is exemplified by a stainless steel wire mesh, and filled in the second gas passageway. The shielding gas is decelerated and dispersed through the stainless steel wire mesh, and hence is blown off at a low velocity in a rectified state, thereby eliminating the anxiety about catching up outside air.

Also preferably, the tip of the external cylinder recedes from the tip of the internal cylinder so as to direct the shielding gas passing through the second gas passageway toward radial outside, and enable to sweep away penetrating outside air toward radial outside.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

The following description is merely exemplary in nature and is in no way intended to limit the invention, its application or uses.

Figure 1:
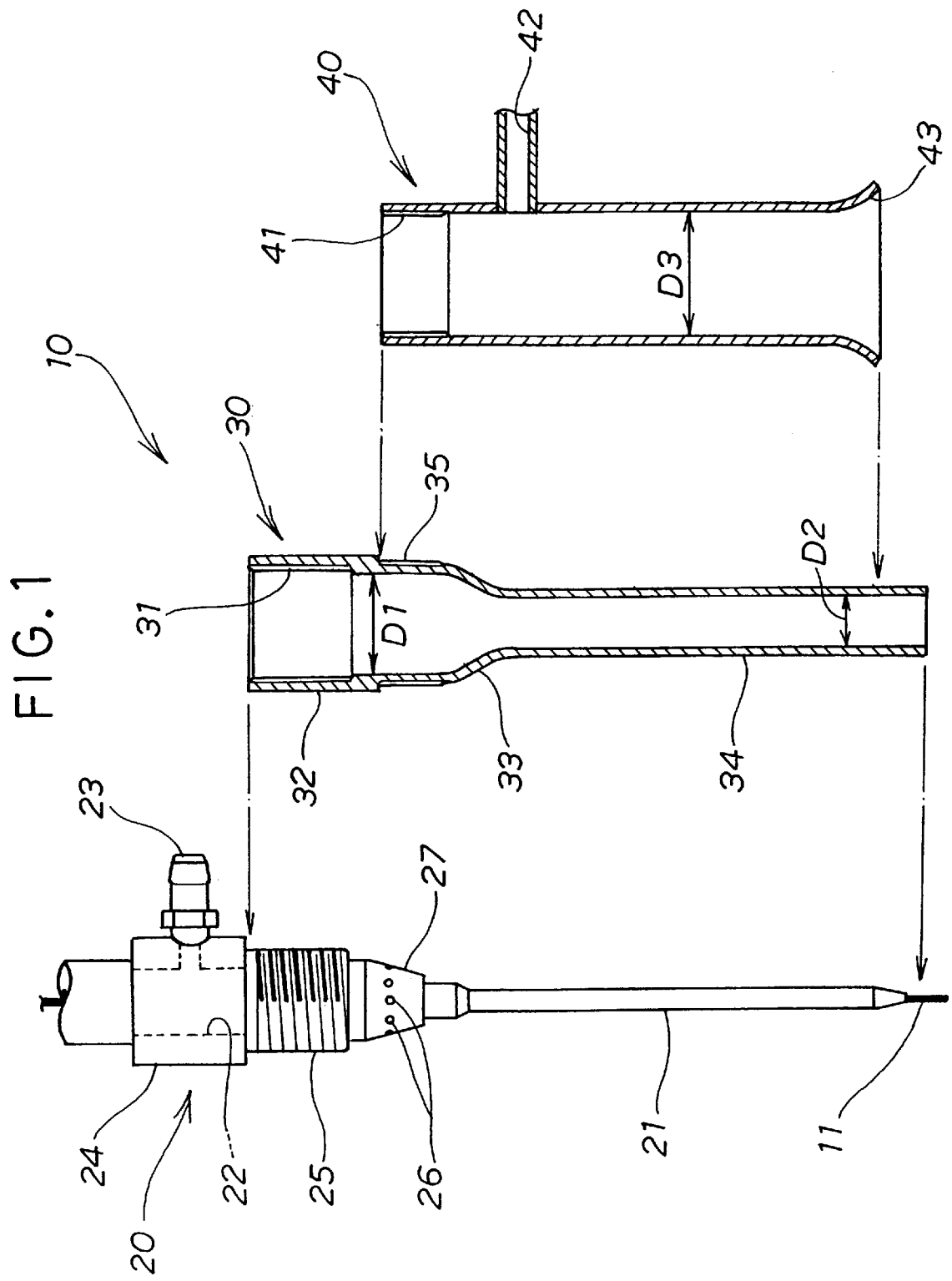
FIG. 1 is an exploded view showing a torch for gas shielded arc welding using a consumable electrode according to the present invention.

As illustrated in FIG. 1, a torch 10 for gas shielded arc welding using a consumable electrode (hereinafter referred to as "welding torch 10") comprises a torch body 20 equipped with a wire guide cylinder 21 for guiding a welding wire 11; an internal cylinder 30 fitted to the torch body 20 in such a manner as to surround the wire guide cylinder 20; and an external cylinder 40 fitted to the internal cylinder 30 in such a manner as to surround the internal cylinder 30.

The torch body 20 being equivalent to a marketed torch product comprises a cylinder body 24 which is equipped with a gas chamber 22 and a first shielding gas feed route 23 and which is threaded as male screw 25; a cone portion 27 which has orifices 26 of a small diameter and is extended from the male screw 25; and the wire guide cylinder 21 which is extended from the cone portion 27.

The internal cylinder 30 is a stepped cylinder composed of a large diameter portion 32 equipped with a female screw 31 to be threaded onto the torch body 20 and a male thread 35 formed on the outer periphery of itself, a tapered tubular portion 33 and a small diameter portion 34 each being connected in series. Therein, the inside diameter D2 of the small diameter portion 34 is approximately halved compared with the inside diameter D1 of the large diameter portion 32. For example, D1 and D2 are set to be 18 mm and 10 mm, respectively.

The external cylinder 40 is In the form of a cylinder which has a female screw 41 provided on its root portion, a second shielding gas feed route 42, and a bellmouth 43 provided on its tip. The bellmouth 43 signifies a smoothly widened portion and is adopted in the opening of a western bell. Therein, the inside diameter D3 of the external cylinder 40 is slightly larger than the diameter D1. For instance, D1 and D3 are set to be 18 mm and about 20 mm, respectively.

Figure 2:
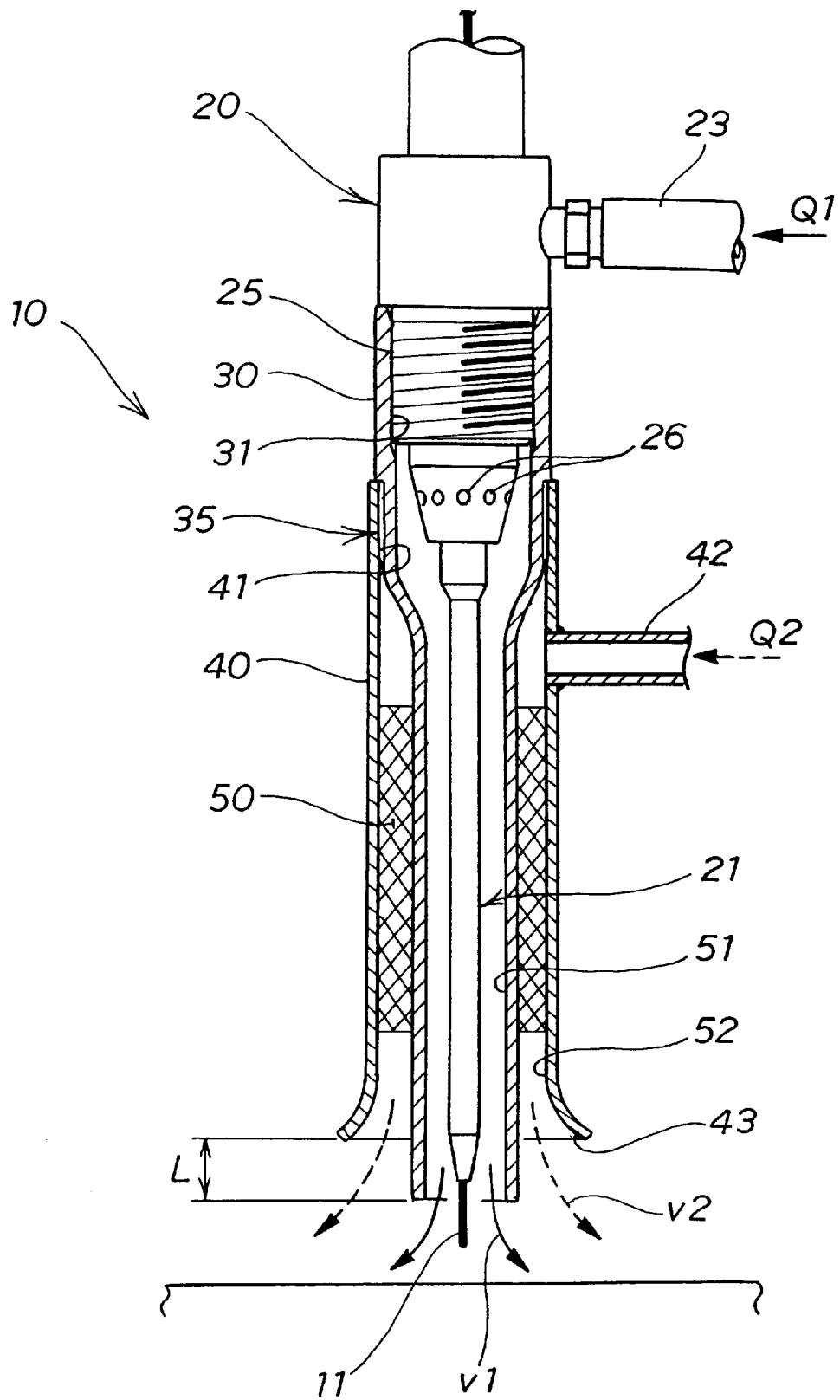
FIG. 2 is a side view illustrating, partially in section, the welding torch as assembled.

FIG. 2 illustrates a welding torch 10 which is assembled by threading the internal cylinder 30 onto the torch body 20 and threading the external cylinder 40 onto the internal cylinder 30. Reference numeral 50 denotes a porous member which is filled in between the internal cylinder 30 and the external cylinder 40, and preferably a stainless steel wire mesh in the form of metallic scrubbing brush.

The assembly leads to a space which is formed between the wire guide cylinder 21 and the internal cylinder 30, and is termed first gas passageway 51. A shielding gas is fed into the resultant first gas passageway 51 via a first shielding gas feed route 23. Likewise, a space which is formed between the internal cylinder 30 and the external cylinder 40 is termed a second gas passageway 52. A shielding gas is fed into the resultant second gas passageway 52 via a second shielding gas feed route 42, which is constituted so that the shielding gas is blown at right angles with the second gas passageway 52. The right angles cause the shielding gas which flows in the second gas passageway 52 via the second shielding gas feed route 42 to change its direction by 90 degrees, during which time the gas is moderately dispersed and almost uniformly passed through the second gas passageway 52.

The present embodiment is characterized in that the tip of the external cylinder 40 is allowed to recede from the tip of the internal cylinder 30 by a prescribed distance L, which however, can be adjusted by turning the external cylinder 40 against the internal cylinder 30 so as to alter the quantity of threading and which is suitably in the range of 5 mm to 8 mm.

Figure 4:
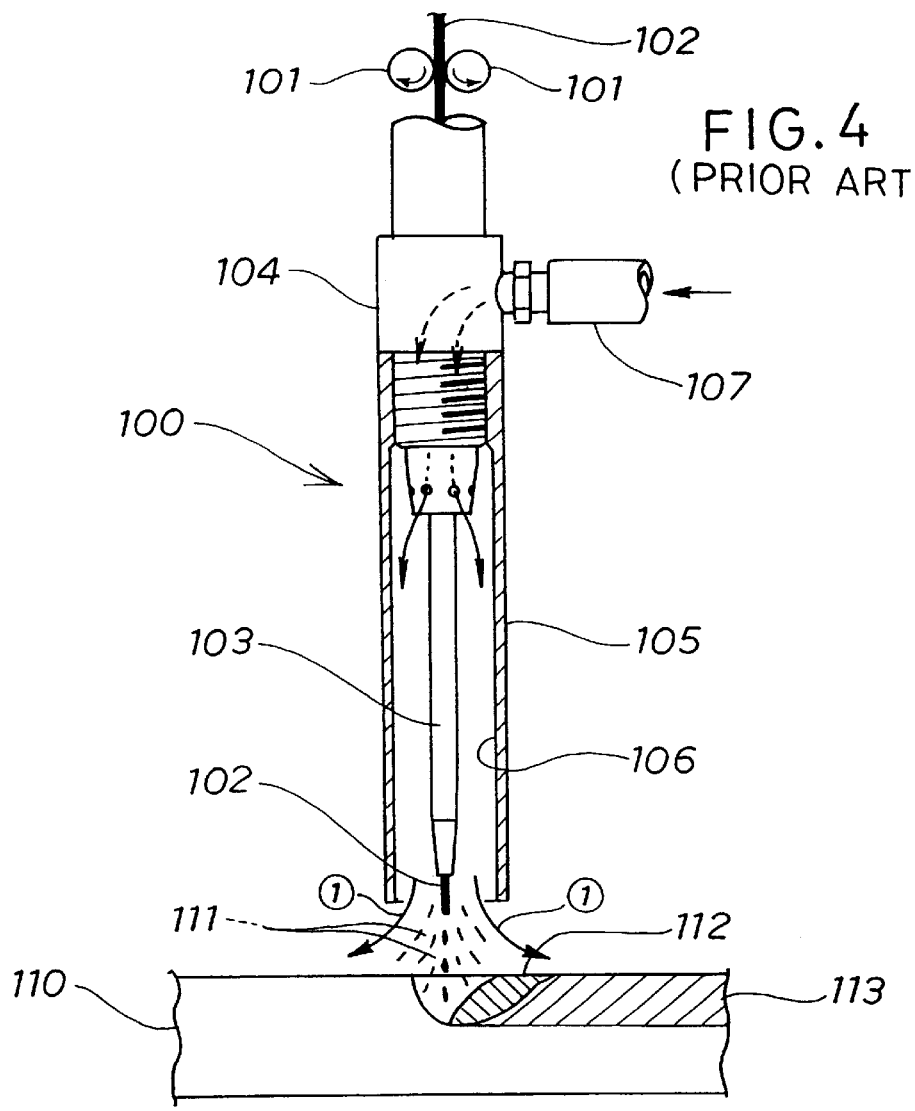
FIG. 4 is a view showing the principle of conventional MIG welding.
Figure 5:
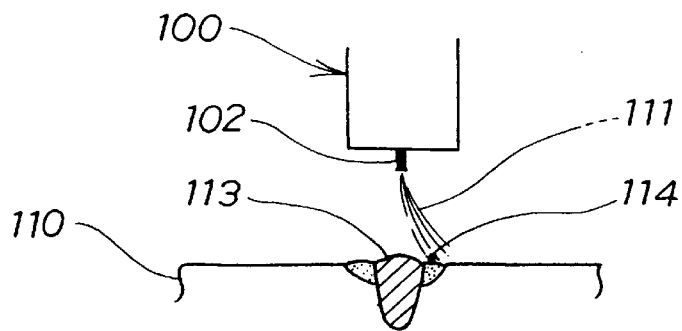
FIG. 5 is a view showing a problem in conventional MIG welding.

Importance should be attached, as being clear from comparison with FIG. 4, to that the outside diameter of the external cylinder 40 is almost the same as the outside diameter of the conventional gas nozzle 105. As a result, the welding torch 10 according to the present embodiment is almost the same as the conventional MIG welding torch 100 in respect of external configuration, Accordingly, the welding work using the welding torch 10 can be carried out with the sense same as conventional sense.

In what follows, some description will be given as to the function of the welding torch having the above constitution.

Figure 3:
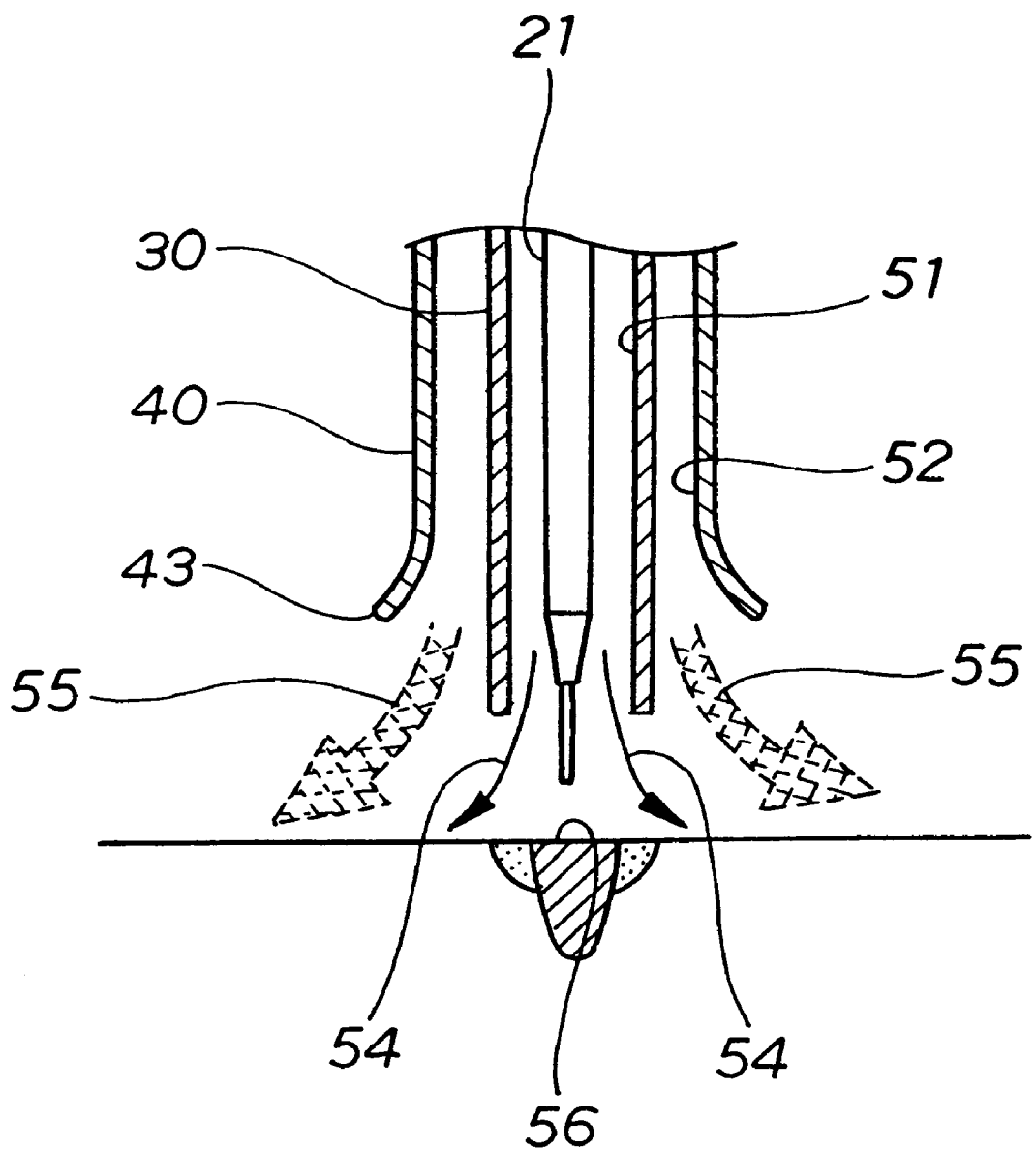
FIG. 3 is an enlarged partial view showing operation of the welding torch.

As illustrated in FIG. 3, the welding torch has a tip configuration of double pipe structure composed of an internal cylinder 30 and an external cylinder 40, and a shielding gas is fed in the first gas passageway 51 formed in the internal cylinder 30, and in the second gas passageway 52 formed between the internal cylinder 30 and the external cylinder 40. Thus, primary interception of outside air is put into practice with a second shielding gas layer 55 that is blown off through the second gas passageway 52 arranged an the outer side, and secondary interception of outside air is put into practice with the first shielding gas layer 54 that is blown off through the first gas passageway 51 arranged on the inner side, thereby enabling complete interception of outside air.

More specifically, when the feed rate of a shielding gas in a conventional welding torch is set on an index of 100, the feed rate Q1 in the first shielding gas feed route 23 is set on an index of 50, and the feed rate Q2 in the second shielding gas feed route 42 is set also on an index of 50.

Since the diameter of the internal cylinder 30 is roughly halved at the tip thereof, the cross sectional area thereat is one quarter of that of a conventional welding torch, and the blowing off speed v1 from the internal cylinder 30 is roughly doubled compared with a conventional speed because of the cross sectional area being about ¼ and the flow rate being about ¼. As a result, it follows that the intercepting performance of the first shielding gas layer 54 as illustrated in FIG. 3 is doubled compared with conventional performance.

In addition, it is made possible to throttle discharge arc and also enhance cooling performance by tapering the tip of the internal cylinder 30 so as to enhance the flow velocity of the shielding gas. That is, the enhanced cooling performance enables molten metal to be rapidly solidified and also to prevent oxidation. In general, the enhanced flow velocity of the first shielding gas layer 54 possibly catch up surrounding air (oxygen). Nevertheless, in so far as the present invention is concerned, the first shielding gas layer 54 is surrounded by the second shielding gas layer 55, which prevents outside air from penetrating. Such constitution and function eliminate the anxiety about catching up outside air.

Turning back to FIG. 2, since the second gas passageway 52 has a cross sectional area about three times that of the first gas passageway 51, the blowing off speed v2 of the shielding gas which constitutes the second shielding gas layer 55 (see FIG. 3) is made to be two thirds of a conventional blowing off speed. Since as mentioned hereinbefore, the second shielding gas layer 55 achieves the primary Interception of outside air, the blowing off speed v2 thereof, when decreased to such an extent, is out of the question in function.

However, decreased flow rate of the shielding gas passing through the second gas passageway 52 possibly brings about channelling or unevenness of the flow. As a countermeasure there against in the present embodiment, a porous member is allowed to intervene in the second gas passageway 52 so as to rectify the shielding gas passing therethrough. By virtue of such rectification, it is possible to preclude channelling or unevenness of the flow, and realize the working effect on the primary interception of outside air. In the second shielding gas feed route 42, the shielding gas is allowed to flow into the second gas passageway 52 at right angles in particular, and thus is uniformized. The foregoing effect contributes to the rectification of the shielding gas passing through the second gas passageway 52. It being so, the welding torch 10 according to the present invention is of such constitution as enabling the rectification of the shielding gas passing through the second gas passageway 52.

Moreover, by allowing the tip of the external cylinder 40 to recede from the tip of the internal cylinder 30 by a prescribed distance L1, it is made possible to direct the shielding gas passing through the second gas passageway 52 toward radial outside instead of inside the internal cylinder 30, and at the same time to sweep away penetrating outside air toward radial outside. Likewise, by forming the opening of the external cylinder 40 with a bellmouth portion, it is made possible to direct the shielding gas passing through the second gas passageway 52 toward radial outside and to sweep away penetrating outside air toward radial outside.

By the functions described above, as illustrated in FIG. 3, it is made possible to prevent the generation of a surface oxide in the vicinity of the deposited metal and that of a wandering phenomenon, thereby enabling to stabilize the arc and proceed with favorable welding work.

In addition, the above-mentioned shielding gas feed rates Q1 and Q2 are each nothing more than a specific example. Thus it may be determined by means of demonstration tests whether (Q1+Q2) is set on a gas flow rate same as that of a conventional flow rate or larger or smaller than that.

Furthermore, pure argon gas is satisfactorily usable as a shielding gas. The MAG welding necessitates strict control of a mixing proportion due to the addition of oxygen gas, thus unfavorably increasing the welding cost. As opposed to the foregoing, pure argon gas need not be controlled in mixing proportion, thereby enabling to suppress the welding cost.

That is to say, by virtue of the features of the present invention, it is made possible to prevent the generation of a wandering phenomenon at the same level as in the MAG welding in spite of using pure argon gas as is the case with the MIG welding and also to suppress catching up of outside air. Consequently, the present invention led to success in enhancing the welding quality as well as suppressing the welding cost.

As described hereinbefore, the present invention led to success in assuring favorable weldability for titanium and stainless steel in spite of the use of pure argon gas as a shielding gas. However, it is acceptable to use a mixed gas wherein pure oxygen gas is mixed in an inert gas as shielding gas for the welding torch according to the present invention. Saying it differently, the welding torch according to the present invention is usable in any of the MIG welding, MAG welding and $CO^2$ gas shielded arc welding.

The configuration of the internal cylinder 30 may be optionally selected, and when it is a straight pipe, the external cylinder 40 may be a stepped cylinder. However, it is more preferable in this case that the internal cylinder 30 be a stepped cylinder, since the flow velocity of the first shielding gas layer is lowered and besides, the external appearance of the welding torch 10 is different from that of a conventional torch.

As the porous member, stainless steel wire mesh is optimum because of its easy availability. However, the porous member may be selected from among porous ceramics, perforated plates, metallic mesh and the like irrespective of the type and kind, provided that it functions as a rectifying plate.

Obviously, various minor changes and modifications of the present invention are possible in the light of the above teaching. It is therefore to be understood that within the scope of the appended claims, the invention may be practiced otherwise than as specifically described.

What is claimed is:

1. A torch for gas shielded arc welding using a consumable electrode, comprising:
    a torch body having a wire guide cylinder for guiding a welding wire;
    an internal cylinder fitted to said torch body in such a manner as to surround said wire guide cylinder;
    an external cylinder fitted to said internal cylinder in such a manner as to surround said internal cylinder wherein said external cylinder has a tip receded a predetermined distance from a tip of said internal cylinder and said tip of said external cylinder has a smoothly widened portion in the shape of a bellmouth;
    a first shielding gas feed route for feeding a shielding gas in a first gas passageway formed between said wire guide cylinder and said internal cylinder; and
    a second shielding gas feed route for feeding the shielding gas in a second gas passageway formed between said internal cylinder and said external cylinder.

2. A torch for gas shielded arc welding using a consumable electrode, according to claim 1, wherein said internal cylinder is composed of a large diameter portion which is fitted to the torch body, and a small diameter portion at an end thereof which is connected to said large diameter portion via a tapered tubular portion.

3. A torch for gas shielded arc welding using a consumable electrode, according to claim 1, wherein said second gas passageway includes a porous member disposed therein for rectifying the shielding gas passing through said second gas passageway.

* * * * *